(12) United States Patent
Carr

(10) Patent No.: US 10,198,846 B2
(45) Date of Patent: Feb. 5, 2019

(54) DIGITAL IMAGE ANIMATION

(71) Applicant: Adobe Systems Incorporated, San Jose, CA (US)

(72) Inventor: Nathan Aaron Carr, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/243,130

(22) Filed: Aug. 22, 2016

(65) Prior Publication Data
US 2018/0053333 A1  Feb. 22, 2018

(51) Int. Cl.
*G06T 13/80* (2011.01)

(52) U.S. Cl.
CPC .................... *G06T 13/80* (2013.01)

(58) Field of Classification Search
CPC .... G06T 13/80; G06F 3/0482; G06F 17/2785
See application file for complete search history.

(56) References Cited

U.S. PATENT DOCUMENTS

| | | |
|---|---|---|
| 7,893,935 B1 | 2/2011 | Neely et al. |
| 8,217,856 B1 | 7/2012 | Petrou |
| 8,303,387 B2 | 11/2012 | Spivack |
| 8,312,552 B1 | 11/2012 | Hadden et al. |
| 8,745,494 B2 | 6/2014 | Spivack |
| 8,799,810 B1 | 8/2014 | Wheeler |
| 8,825,081 B2 | 9/2014 | Arrasvuori et al. |
| 8,866,847 B2 | 10/2014 | Bedi et al. |
| 10,068,378 B2 | 9/2018 | Cabanier et al. |
| 2009/0037822 A1 | 2/2009 | Kandekar et al. |
| 2009/0048908 A1 | 2/2009 | Kaplan et al. |
| 2009/0087024 A1 | 4/2009 | Eaton et al. |
| 2009/0094518 A1* | 4/2009 | Lawther ............... G06F 3/04817 715/716 |
| 2010/0082436 A1 | 4/2010 | Maghoul et al. |
| 2010/0226535 A1 | 9/2010 | Kimchi et al. |
| 2011/0258049 A1 | 10/2011 | Ramer et al. |
| 2011/0283223 A1 | 11/2011 | Vaittinen et al. |
| 2012/0030227 A1 | 2/2012 | Mital et al. |

(Continued)

OTHER PUBLICATIONS

Fei-Fei, Li, and Pietro Perona. "A bayesian hierarchical model for learning natural scene categories." Computer Vision and Pattern Recognition, 2005. CVPR 2005. IEEE Computer Society Conference on. vol. 2. IEEE, 2005.*

(Continued)

*Primary Examiner* — Diane M Wills
(74) *Attorney, Agent, or Firm* — Wolfe-SBMC

(57) ABSTRACT

Digital image animation techniques are described. In one example, animations are used for a single digital image to permit movement or other effects to be exhibited as part of the digital image without requiring multiple frames as in conventional techniques. Transformation of the single digital image by the animations may also be coordinated, such as to synchronize or not synchronize movement of objects to promote realism. In another example, portions and even an entirety of these techniques may be performed automatically and without user intervention. Machine learning, for instance, may be employed using a neural network to classify the digital image into one or more semantic classes. The semantic classes may then be used to recommend animations to transform the digital image.

14 Claims, 8 Drawing Sheets

(56) References Cited

U.S. PATENT DOCUMENTS

| | | |
|---|---|---|
| 2013/0050258 A1 | 2/2013 | Liu et al. |
| 2013/0236161 A1 | 9/2013 | Takeda |
| 2014/0268356 A1 | 9/2014 | Bolas et al. |
| 2014/0333664 A1 | 11/2014 | Williams et al. |
| 2015/0058347 A1 | 2/2015 | Russek |
| 2015/0120648 A1 | 4/2015 | Slovacek |
| 2015/0234796 A1 | 8/2015 | Williams et al. |
| 2015/0254892 A1* | 9/2015 | Smith ............ G06T 13/40 345/419 |
| 2015/0324698 A1 | 11/2015 | Karaoguz et al. |
| 2015/0348322 A1 | 12/2015 | Ligameri et al. |
| 2016/0027214 A1 | 1/2016 | Memmott et al. |
| 2016/0055201 A1 | 2/2016 | Poupyrev et al. |
| 2016/0093105 A1 | 3/2016 | Rimon et al. |
| 2016/0112667 A1 | 4/2016 | Park et al. |
| 2016/0133052 A1 | 5/2016 | Choi et al. |
| 2016/0343107 A1 | 11/2016 | Newman et al. |
| 2017/0026577 A1 | 1/2017 | You et al. |
| 2017/0061696 A1 | 3/2017 | Li et al. |
| 2017/0064374 A1 | 3/2017 | Eim et al. |
| 2017/0153698 A1 | 6/2017 | Bamidele et al. |
| 2017/0160815 A1 | 6/2017 | Glazier et al. |
| 2017/0163839 A1 | 6/2017 | Arana et al. |
| 2017/0277256 A1 | 9/2017 | Burns et al. |
| 2018/0039479 A1 | 2/2018 | Fransen et al. |
| 2018/0041750 A1 | 2/2018 | Kim |
| 2018/0046363 A1 | 2/2018 | Miller et al. |
| 2018/0053236 A1 | 2/2018 | Fransen et al. |
| 2018/0059898 A1 | 3/2018 | Miller et al. |
| 2018/0061128 A1 | 3/2018 | Cabanier et al. |
| 2018/0075655 A1 | 3/2018 | Cabanier et al. |
| 2018/0107805 A1 | 4/2018 | Anantharaman |
| 2018/0330548 A1 | 11/2018 | Cabanier et al. |

OTHER PUBLICATIONS

Dailey, Matthew N., et al. "EMPATH: A neural network that categorizes facial expressions." Journal of cognitive neuroscience 14.8 (2002): 1158-1173.*

"Blippar: Augmented Reality App Turns Everyday Products Into Interactive Experience", Business NewsDaily, Dec. 16, 2013.*

"PAVR Creates Emmy Award-Winning 360-Degree Video for FOX Sports", The Creative Cloud Team—Retrieved at: http://blogs.adobe.com/creativecloud/pavr-creates-emmy-award-winning-360-degree-video-for-fox-sports/, Jul. 13, 2016, 3 pages.

Chuang,"Animating Pictures with Stochastic Motion Textures", ACM Transactions on Graphics, vol. 24, No. 3, to appear, (Proceedings of ACM SIGGRAPH 2005, Jul. 2005, Los Angeles), Jul. 2005, 8 pages.

Conner-Simons,"Reach in and Touch Objects in Videos with "Interactive Dynamic Video"", Retrieved at: https://www.csail.mit.edu/reach_in_and_touch_objects_in_videos_with%20_interactive_dynamic_video, Aug. 2, 2016, 3 pages.

Lumb,"New MIT tech lets you mess with objects in pre-recorded video—Yes, they've already successfully tested it in 'Pokémon Go.'", Retrieved at: https://www.engadget.com/2016/08/03/new-mit-tech-lets-you-mess-with-objects-in-pre-recorded-video/, Aug. 3, 2016, 2 pages.

"Pre-Interview Communication", U.S. Appl. No. 15/262,616, dated Sep. 21, 2017, 3 pages.

"First Action Interview Office Action", U.S. Appl. No. 15/262,616, dated Nov. 2, 2017, 3 pages.

"Final Office Action", U.S. Appl. No. 15/244,656, dated Sep. 21, 2017, 48 pages.

"Non-Final Office Action", U.S. Appl. No. 15/244,656, dated Jun. 14, 2017, 29 pages.

"Augmented Reality & Visual Discovery Solutions | Blippar", Retrieved at: https://blippar.com/en/—on Aug. 22, 2016, 10 pages.

"Non-Final Office Action", U.S. Appl. No. 15/297,032, dated Dec. 1, 2017, 17 pages.

"Pre-Interview Communication", U.S. Appl. No. 15/227,300, dated Feb. 5, 2018, 3 pages.

"Corrected Notice of Allowance", U.S. Appl. No. 15/262,616, dated May 8, 2018, 11 pages.

"First Action Interview Office Action", U.S. Appl. No. 15/227,300, dated Jun. 5, 2018, 5 pages.

"First Action Interview Office Action", U.S. Appl. No. 15/228,680, dated Jul. 5, 2018, 11 pages.

"Non-Final Office Action", U.S. Appl. No. 15/244,656, dated Jun. 28, 2018, 70 pages.

"Pre-Interview Communication", U.S. Appl. No. 15/228,680, dated May 17, 2018, 11 pages.

"Pre-Interview First Office Action", U.S. Appl. No. 15/233,532, dated Jun. 1, 2018, 4 pages.

"Restriction Requirement", U.S. Appl. No. 15/246,137, dated Jul. 20, 2018, 6 pages.

"Notice of Allowance", U.S. Appl. No. 15/262,616, dated Apr. 27, 2018, 14 pages.

"Final Office Action", U.S. Appl. No. 15/297,032, dated Aug. 16, 2018, 17 pages.

"First Action Interview Office Action", U.S. Appl. No. 15/233,532, dated Aug. 28, 2018, 4 pages.

"Non-Final Office Action", U.S. Appl. No. 15/246,137, dated Sep. 10, 2018, 20 pages.

"Pre-Interview First Office Action", U.S. Appl. No. 15/246,137, dated Sep. 21, 2018, 5 pages.

"Final Office Action", U.S. Appl. No. 15/227,300, dated Nov. 30, 2018, 15 pages.

"Final Office Action", U.S. Appl. No. 15/228,680, dated Oct. 12, 2018, 52 pages.

"Final Office Action", U.S. Appl. No. 15/233,532, dated Nov. 1, 2018, 29 pages.

"First Action Interview Office Action", U.S. Appl. No. 15/246,137, dated Dec. 6, 2018, 3 pages.

* cited by examiner

DIGITAL IMAGE ANIMATION

BACKGROUND

Conventional digital images are captured and rendered in a static manner. For example, a user of a conventional digital camera (e.g., as part of a mobile phone) may capture a single digital image. This image may then be output for display, which may involve uploading to a social network, communication via a multimedia message, set as a lock screen or background, and so forth. Even though image processing techniques may be applied to this single digital image, the image when rendered is still static and does not change. Static images are a classic form of entertainment or art, but may be left behind as advances in technology enable different forms of visual expression.

One conventional technique used to address this lack of evolution is the capture of "live" images. Live images are configured as short videos having a few frames that are then played back in order to give an appearance of motion. However, this is only one particular approach to enhancing a static image and it has its own undesirable results. For example, live images may include undesirable actions and motions that are captured in different frames such that the subject matter of the frame is not in agreement from frame to frame. This may include a user blinking or looking away in a head shot, having a dog walk into the video when capturing images of a family at a wedding, and so forth. Thus, the evolution of static images as modern technology advances is still open for exploration.

SUMMARY

Digital image animation techniques are described to add a new form of expression to static images. In one example, animations are used for a single digital image to permit movement or other effects to be exhibited as part of the digital image without requiring multiple frames as in conventional techniques of "live images" as above. A user, for instance, may manually select from a plurality of animations that are made available to transform the digital image when rendered. This may include changes to objects already in the digital images and/or addition of objects. The animations are then applied to the image in order to transform rendering of the image, e.g., to exhibit movement or other effects Transformation of the single digital image by the animations may also be coordinated, such as to synchronize or not synchronize movement of objects to promote realism. This may also include looping techniques to incorporate differences in successive outputs of the animations, such that to reduce an appearance of repetitiveness of the animations, include use of audio (e.g., ambient sounds), and so forth.

In another example, portions and even an entirety of these techniques may be performed automatically and without user intervention. Machine learning, for instance, may be employed using a neural network to classify the digital image into one or more semantic classes. Semantic classes describe "what" is included in the image, such as objects, types of image scene (e.g., landscape, winter scene), and even feelings invoked when viewing the image, e.g., "happy," "inspiring," and so forth. The semantic classes may then be used to recommend animations to transform the digital image. The recommendations, for instance, may be output via a user interface for selection by a user. In another instance, the recommendations are applied automatically and without user intervention to the digital image. A decision tree may then be employed to determine "how" to apply these animations (e.g., automatically and without user intervention), such as which objects of the digital image are susceptible to showing an effect of the animation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
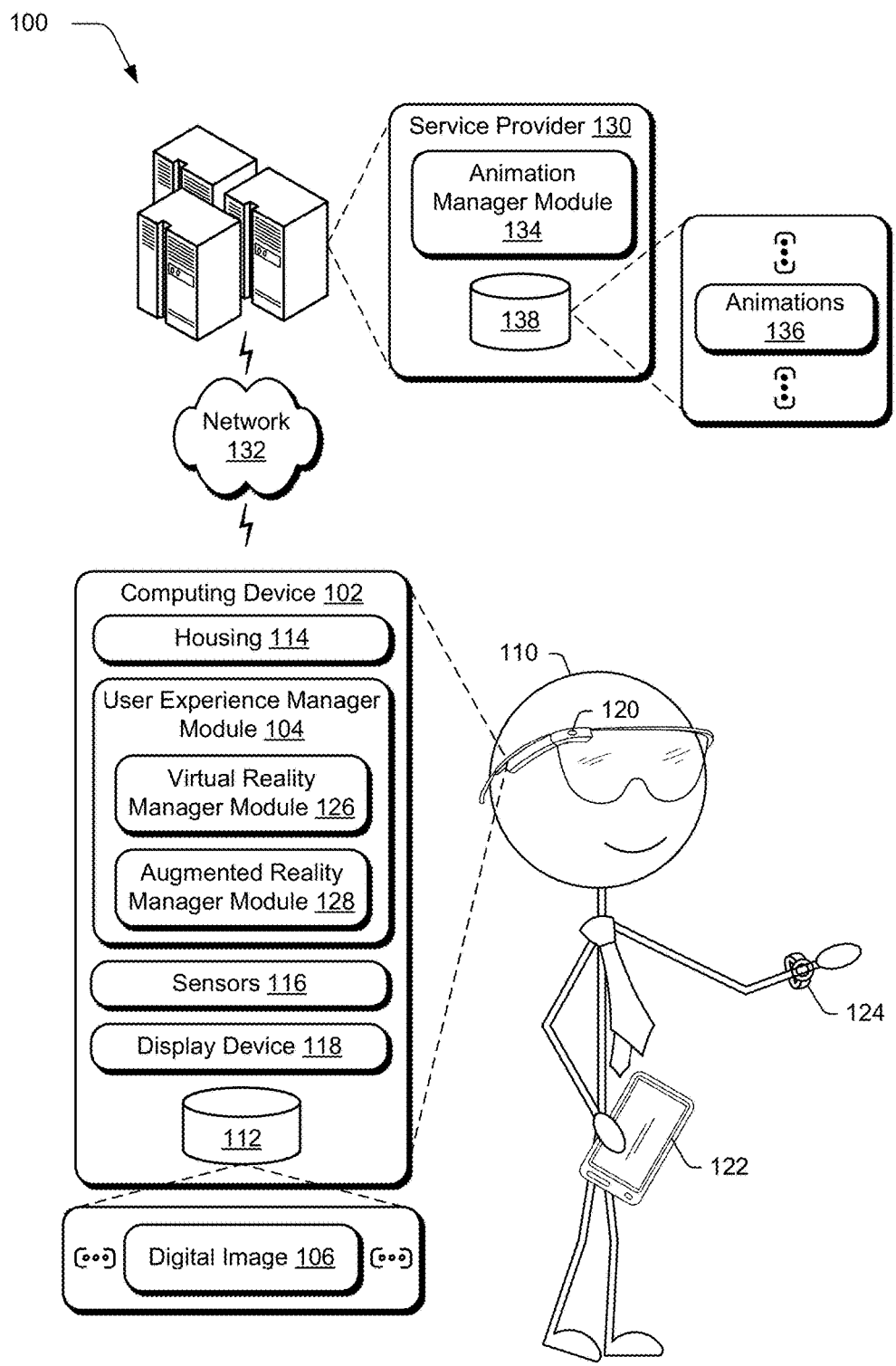
FIG. 1 is an illustration of an environment in an example implementation that is operable to employ techniques described herein.

Conventional techniques to capture digital images are static in that the images captured, by themselves, do not exhibit movement when rendered. Although techniques such as "live images" have been developed to show movement and increase user interaction, the frames of the live images may introduce undesirable effects. The live images, for instance, are captured as a series of static digital images that are then relied upon to show movement of objects within the series. Therefore, each of the frames may show changes over time that may not be desirable as part of an overall effect or goal desired from the image, such as to introduction additional objects or motions of desired objects in successive frames.

Digital image animation techniques are described. These techniques enable a user to select a single desired digital image and then animate that image. In this way, undesirable effects caused by conventional techniques that relied on capture of a series of images may be avoided. This may be performed in a variety of ways.

In one example, a user may manually select from a plurality of animations that are made available to transform the digital image when rendered. The user, for instance, may capture a digital image of a friend on a ski slope. The user may then select animations to include an appearance of a snowfall, wind blowing, the rising of a sun, and so forth. This may include changes to objects already in the digital images (e.g., movement of trees) and/or additional of objects (e.g., clouds in the sky).

Transformation of the single digital image by the animations may also be coordinated, such as to synchronize movement of trees already in the image due to the blowing of the wind. This may also include looping techniques to incorporate differences in successive outputs of the animations, such that to reduce an appearance of repetitiveness of the animations in waves crashing on a beach. Audio effects may also be incorporated as part of the animations, such as sounds of the wind blowing, ambient sounds, and so forth.

In another example, portions and even an entirety of these techniques may be performed automatically and without user intervention. Machine learning, for instance, may be employed using a neural network to classify the digital image into one or more semantic classes. Semantic classes describe "what" is included in the image, such as objects, types of image scene (e.g., landscape, winter scene), and even feelings invoked when viewing the image, e.g., "happy," "inspiring," and so forth.

The semantic classes may then be used to recommend animations to transform the digital image. The recommendations, for instance, may be output via a user interface for selection by a user. In another instance, the recommendations are applied automatically and without user intervention to the digital image. The animations may be configured in a variety of ways as previously described. Thus, in these examples a user may select a single digital image having desired characteristics and then animate the digital image. In this way, these techniques may expand functionality to the billions of static images that have been and continue to be captured by users. Further discussion of these and other examples is included in the following sections.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102 configured for use in digital image animation. Digital image animation may be used for conventional static images, and well as images in augmented reality and/or virtual reality scenarios.

Figure 9:
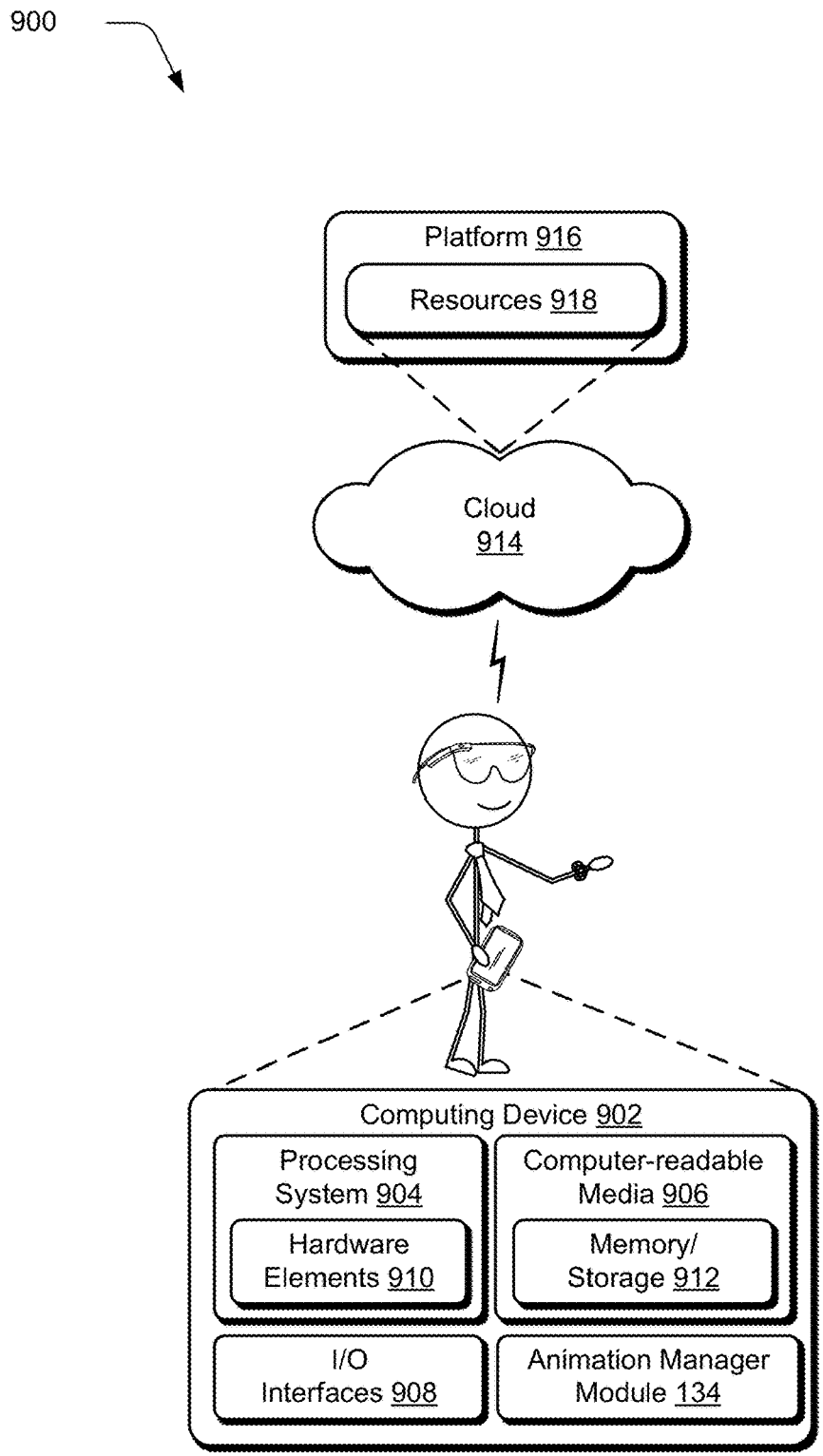
FIG. 9 illustrates an example system including various components of an example device that can be implemented as any type of computing device as described and/or utilize with reference to FIGS. 1-8 to implement embodiments of the techniques described herein.

The computing device 102 is illustrated as including a user experience manager module 104 that is implemented at least partially in hardware of the computing device 102, e.g., a processing system and memory of the computing device as further described in relation to FIG. 9. The user experience manager module 104 is configured to manage output of and user interaction with a digital image 106. The digital image 106 is illustrated as maintained in storage 112 of the computing device 102.

The computing device 102 includes a housing 114, one or more sensors 116, and a display device 118. The housing 114 is configurable in a variety of ways to support interaction with the digital image 106. In one example, the housing 114 is configured to be worn on the head of a user 110 (i.e., is "head mounted" 120), such as through configuration as goggles, glasses, contact lens, and so forth. In another example, the housing 114 assumes a hand-held 122 form factor, such as a mobile phone, tablet, portable gaming device, and so on. In yet another example, the housing 114 assumes a wearable 124 form factor that is configured to be worn by the user 110, such as a watch, broach, pendant, or ring. Other configurations are also contemplated, such as configurations in which the computing device 102 is disposed in a physical environment apart from the user 110, e.g., as a "smart mirror," wall-mounted projector, television, and so on.

The sensors 116 may also be configured in a variety of ways to detect a variety of different conditions. In one example, the sensors 116 are configured to detect an orientation of the computing device 102 in three dimensional space, such as through use of accelerometers, magnetometers, inertial devices, radar devices, and so forth. In another example, the sensors 116 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 116 are configured to detect environmental conditions involving the user 110, e.g., heart rate, temperature, movement, and other biometrics.

The display device 118 is also configurable in a variety of ways to support a virtual user experience. Examples of which include a typical display device found on a mobile device such as a camera or tablet computer, a light field display for use on a head mounted display in which a user may see through portions of the display, stereoscopic displays, projectors, television (e.g., a series of curved screens arranged in a semicircular fashion), and so forth. Other hardware components may also be included as part of the computing device 102, including devices configured to provide user feedback such as haptic responses, sounds, and so forth.

The housing 114, sensors 116, and display device 118 are also configurable to support different types of virtual user experiences by the user experience manager module 104. In one example, a virtual reality manager module 126 is employed to support virtual reality. In virtual reality, a user is exposed to an immersive environment, the viewable portions of which are entirely generated by the computing device 102. In other words, everything that is seen by the user 110 is rendered and displayed by the display device 118 through use of the virtual reality manager module 126 by rendering of the digital image 106.

The user, for instance, may be exposed to virtual objects as part of the digital image 106 that are not "really there" (e.g., virtual bricks) and are displayed for viewing by the user in an environment that also is completely computer generated. The computer-generated environment may also include representations of physical objects included in a physical environment of the user 110, e.g., a virtual table that is rendered for viewing by the user 110 to mimic an actual physical table in the environment detected using the sensors 116. On this virtual table, the virtual reality manager module 126 may also dispose virtual objects that are not physically located in the physical environment of the user 110, e.g., the virtual bricks as part of a virtual playset. In this way, although an entirely of the display being presented to the user 110 is computer generated, the virtual reality manager module 126 may represent physical objects as well as virtual objects within the display.

The user experience manager module 104 is also illustrated as supporting an augmented reality manager module 128. In augmented reality, the digital image 106 is used to augment a direct view of a physical environment of the user 110. The augmented reality manger module 128, for instance, may detect landmarks of the physical table disposed in the physical environment of the computing device 102 through use of the sensors 116, e.g., object recognition. Based on these landmarks, the augmented reality manager module 128 configures the digital image 106 to be viewed within this environment.

The user 110, for instance, may view the actual physical environment through head-mounted 120 goggles. The head-mounted 120 goggles do not recreate portions of the physical environment as virtual representations as in the VR scenario above, but rather permit the user 110 to directly view the physical environment without recreating the environment. The digital image 106 is then displayed by the display device 118 to appear as disposed within this physical environment. Thus, in augmented reality the digital image 106 augments what is "actually seen" by the user 110 in the physical environment. In the following discussion, the digital image 106 may be rendered by the user experience manager module 104 in both a virtual reality scenario and an augmented reality scenario.

The environment 100 is further illustrated as including a service provider 130 that is accessible to the computing device 102 via a network 132, e.g., the Internet. The service provider 130 is configurable in a variety of ways, such as a social network service, content creation service, digital image 106 repository, and so forth. The user 110, for instance, may cause upload of the digital image 106 via the network 132 for sharing with other friends of the user 110. The friends of the user may then view the digital image 106 via a webpage, as part of a virtual or augmented reality scenario, and so forth.

In order to increase engagement of users with the digital image 106, an animation manager module 134 is employed to incorporate animations 136 as part of the digital image 106 when rendered, which are illustrated as stored in storage 138 of the service provider 130. Although functionality of the animation manager module 134 is illustrated as implemented by the service provider 130, this functionality may also be implemented locally by the computing device 102, e.g., through use of a processing system and computer-readable storage media as further described in relation to FIG. 9.

The animations 136, when rendered along with the digital image 106, may be configured to exhibit movement of objects already contained or added to the digital image 106. Thus, the animations 136 may be used to further draw a user's attention to the digital image 106. This also simplifies an ability of the user 110 to select and share a single digital image 106 having desired content over conventional selection of a series of frames that increase a likelihood of undesired objects.

Through use of the techniques described herein an animation 136 may be added to a single digital image 106 which has desired content and thus may exhibit movement without the drawbacks of conventional live images. Additionally, use of animations 136 may increase functionality of the billions of static digital images that have been captured and continue to be captured by users. This may be especially useful in AR/VR scenarios in which a lack of motion by conventional digital images may appear unnatural in immersive environments. Incorporation of animations 136 as part of a digital image may be implemented in a variety of ways, such as through manual selection as described beginning in relation to FIG. 3 or automatically as part of machine learning as further described in relation to FIG. 6.

Animations 136 may be applied by the animation manager module 134 to digital images 106 in a variety of ways. One challenge is selecting animations is to use animations that appear natural to a user. Swaying of a tree and movement of waves, for instance, may appear natural as opposed to a view of the same dog walking through the image. Accordingly, the animation manager module 134 may employ machine learning (e.g., a neural network) to classify and segment objects within the digital image 106. A neural network, for instance, may classify a sky, trees, waves, fire, flowing water, and so forth within the digital image 106. These classified object may then be "segmented" and animated using video exemplars.

Figure 4:
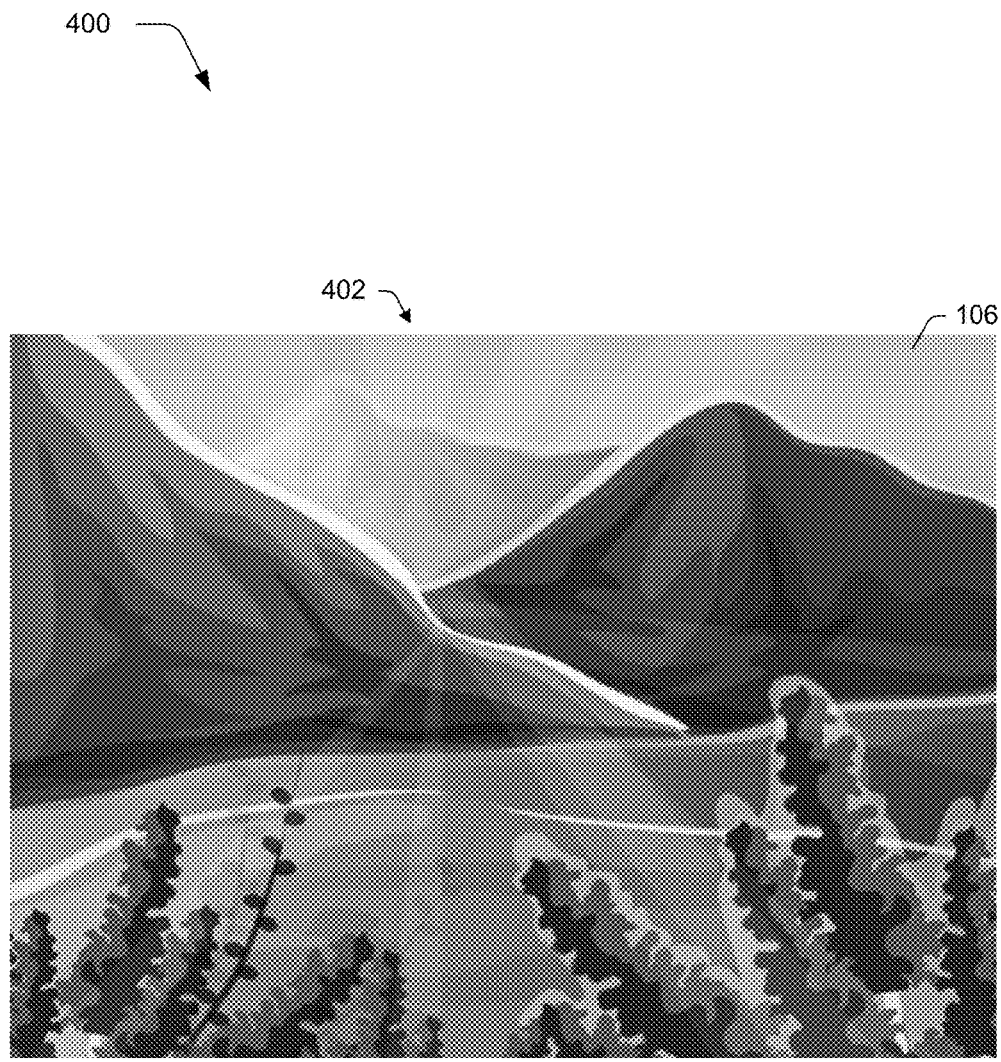
FIG. 4 depicts an example of an animation of a sunburst added to a digital image.

The animation manager module 134, for instance, may locate one or more video exemplars having waves similar to waves in the digital image 106. The video exemplars having these waves may then be used to form a plurality of frames of the digital image 106 to form the animation using corresponding frames from the video exemplars, e.g., using a patch matching technique. Similar techniques may also be used to animate trees, include a snowfall, and so forth. Additionally, as part of this patch matching techniques, a weight or other techniques may be employed to promote stereoscopic consistent between images to be viewed by different eyes of the users. Accordingly, these techniques are an example of appearance transfer from an exemplar to the digital image 106 using patches to form the animation. Similar techniques may also be used to incorporate an overall effect to the digital image 106, such as a sunburst effect to trees, mountains, and a valley as shown in FIG. 4.

See U.S. patent application Ser. Nos. 15/052,552 and 15/052,710 "Appearance Transfer Techniques" and "Appearance Transfer Techniques Maintaining Temporal Coherence, filed Feb. 24, 2016, the entire disclosures of which are hereby incorporated by reference as examples of appearance transfer. See Also U.S. Patent Application titled, "Stereoscopic Target Region Filling," Ser. No. 13/866,632, filed Apr. 19, 2013; U.S. Patent Application titled "Stereo Correspondence and Depth Sensors," Ser. No. 13/690,724, and filed Nov. 30, 2012, U.S. Patent Application titled "Stereo Correspondence Model Fitting," Ser. No. 13/720, 316, filed Dec. 19, 2012; and U.S. Patent Application titled "Methods and Apparatus for Preparation of Casual Stereoscopic Video," filed Nov. 30, 2010 as examples of techniques usable to enforce stereoscopic consistency, the entire disclosures of which are hereby incorporated by reference.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Digital Image Animation

Figure 2:
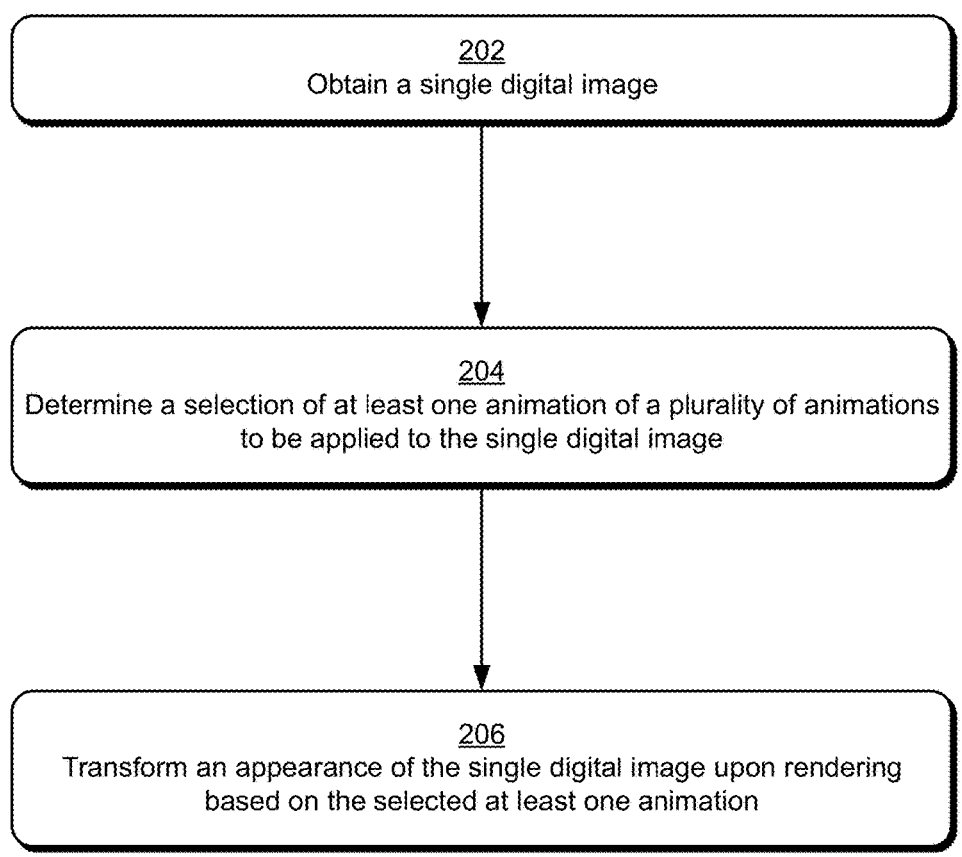
FIG. 2 is a flow diagram depicting a procedure in an example implementation in which a single digital image is transformed upon rendering through a selection of an animation.
Figure 3:
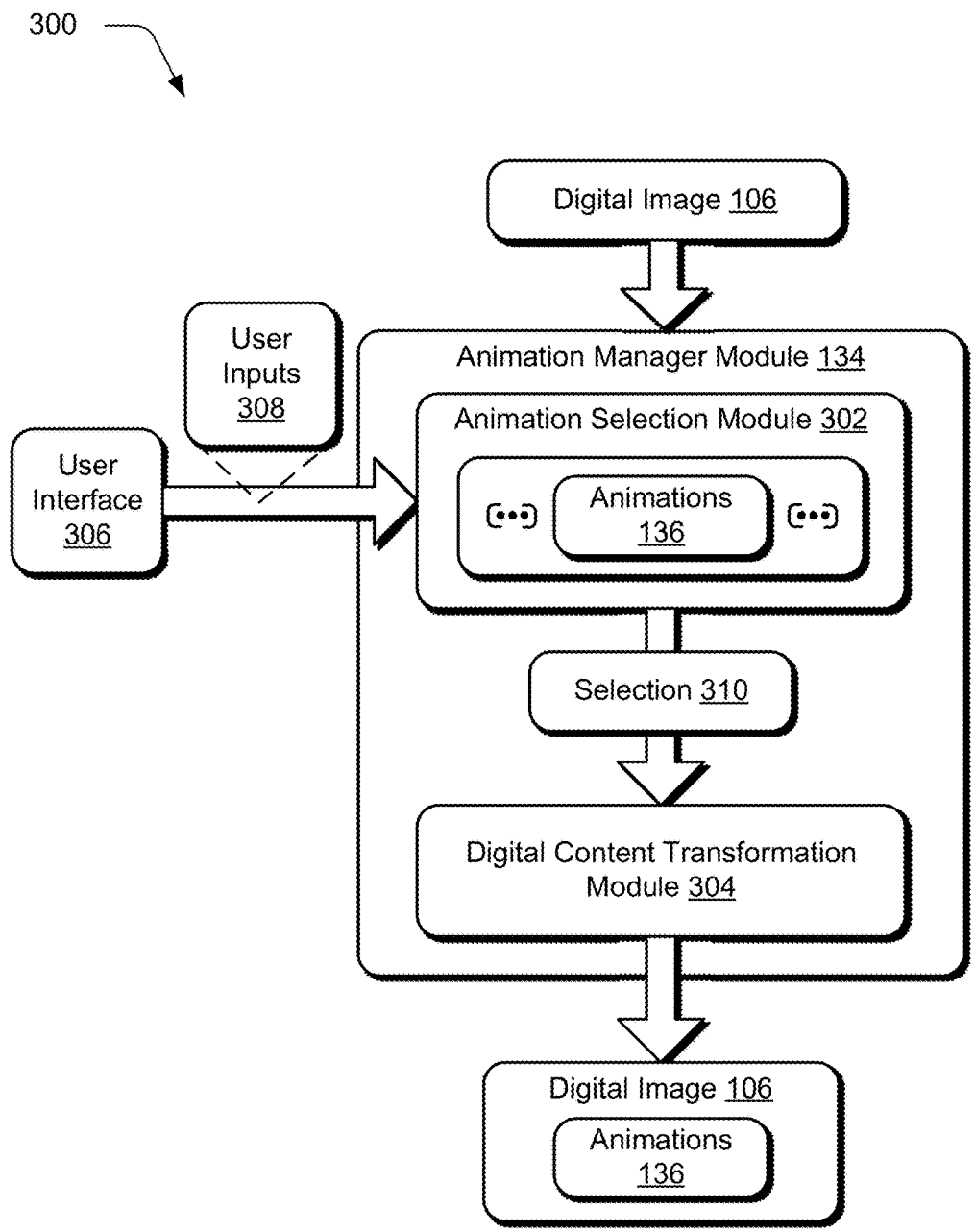
FIG. 3 depicts a system in an example implementation in which a user manually selects an animation for use in rendering the digital image.

FIG. 2 depicts a procedure 200 in an example implementation in which a single digital image is transformed upon rendering through a selection of an animation. FIG. 3 depicts a system 300 in an example implementation in which a user manually selects an animation for use in rendering the digital image. The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In the following, discussion is made interchangeably between FIGS. 2 and 3.

To begin, the animation manager module 134 obtains a single digital image 106 (block 202). When implemented as part of the service provider 130, for instance, the digital image 106 may be obtained remotely from the computing device 102 via the network 132. When implemented locally by the computing device 102, the animation manager module 134 (as part of the user experience module 104) obtains the digital image 106 from storage that is local to the computing device 102, from a peripheral device (e.g., a dedicated camera), and so forth.

The animation manager module 134 includes an animation selection module 302 that is implemented at least partially in hardware, e.g., the computing device 102, servers of the service provider 130, and so forth. The animation selection module 302 is representative of functionality in this example to configure and output a user interface 306 to receive user inputs 308 that specify selection of at least one of a plurality of animations 136. From these user inputs 308, a determination of a selection 310 is made of at least one animation of the plurality of animations 136 to be applied to the single digital image 106 (block 204). The user interface 306, for instance, may include representations of the plurality of animations 136. The user 110 may then provide user inputs 308 involving selection of these representations, e.g., by clicking on the representations using a cursor control device, a spoken utterance, and so forth.

The selection 310 is then communicated to a digital content transformation module 304. Based on the selection, an appearance is transformed of the single digital image upon rendering using the at least one animation (block 206). The animations 136, for instance, may be used to exhibit movement of objects already included in the digital 106, introduce additional objects, and so forth. Example of which are further described in the following.

FIG. 4 depicts an example 400 of an animation 136 of a sunburst added to a digital image 106. In this example, a digital image 106 is received that captures an image scene of mountains and a meadow. An animation 402 is added that gives an appearance of a sunburst to the mountain scene. The sunburst may include changing an appearance of objects already included in the scene, e.g., rays over the mountains and valley, glow around the lilacs, etc. This may also include adding an object, e.g., the sun as it rises from behind the mountains. In this way, the static single digital image 106 is enhanced by the animation 402 to give a feeling of movement and increase user immersion, which is particularly beneficial as part of AR/VR scenarios.

Figure 5:
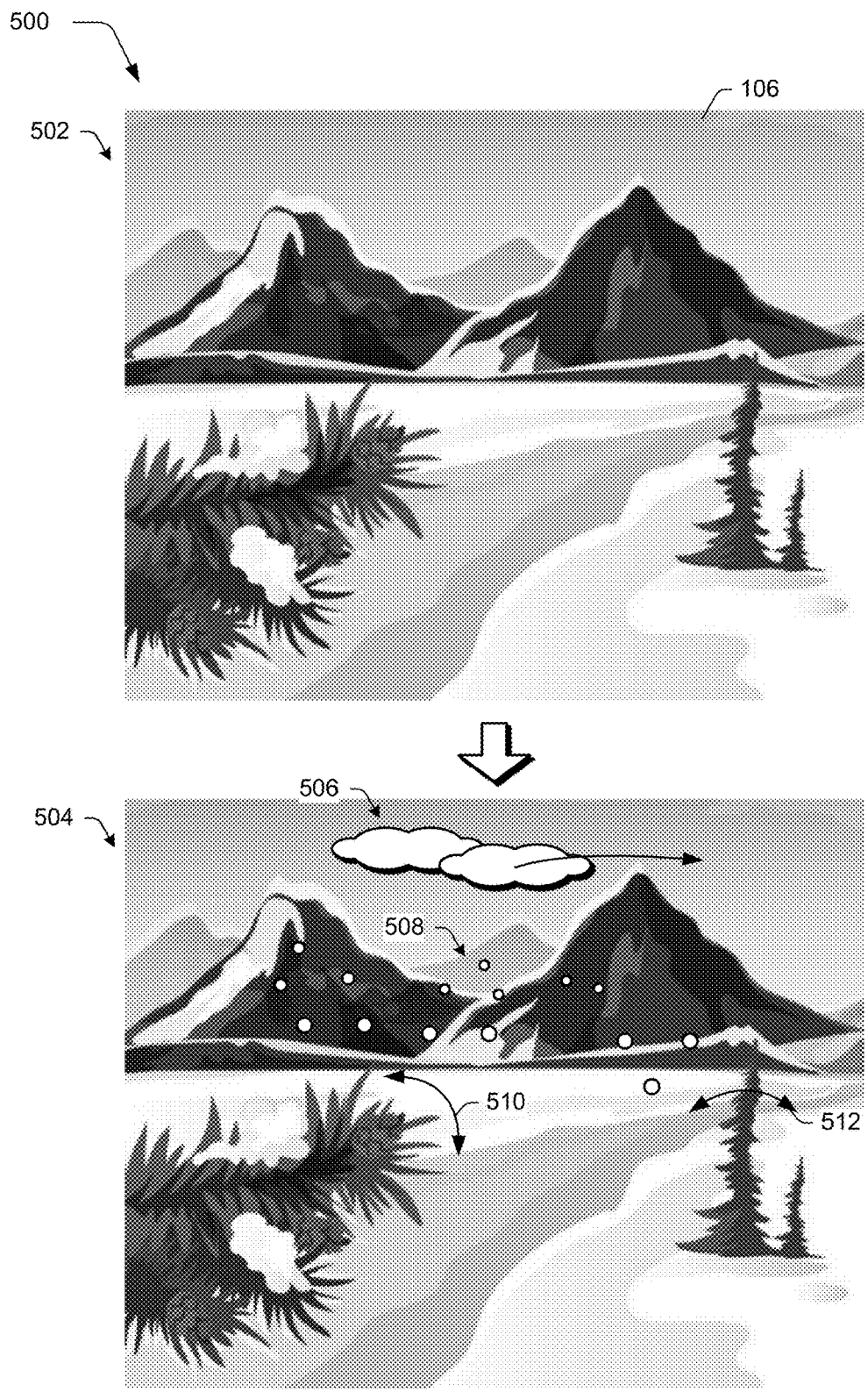
FIG. 5 depicts another example of addition of a plurality of animations to a digital image.

FIG. 5 depicts another example 500 of addition of a plurality of animations 136 to a digital image 106. This example 500 is illustrated using first and second stages 502, 504. At the first stage 502, the digital image 106 is illustrated as received by the animation manager module 134. As illustrated, the digital image 106 captures a mountain scene with snow and trees.

At the second stage 504, a plurality of animations is applied to the digital image 106 for output as part of rendering of the image. In one example, a cloud animation 506 includes addition of clouds to a skyline of the digital image 106. This may be performed in a variety of ways, such as to dispose the objects (e.g., the clouds) over a background of the digital image 106 forming the sky. In another instance, the digital image 106 is segmented by the animation manager module 134, such as to separate the sky into a separate layer. The sky may then be replaced by the animation 506 having the clouds.

In another example, an animation 508 involves inclusion of falling snow as part of the digital image. This animation 508 may be configured to repeat (i.e., loop) over subsequent iterations to give a continuous appearance of the snowfall. As part of this repetition, techniques may be employed to incorporate differences in subsequent outputs of the image, such as to incorporate different patterns and speeds of the snowfall during successive renderings. This may be used to promote realism by limiting an ability of a user to notice repetition in back-to-back renderings of the animations. Similar techniques may be used for waves at a beach, and so forth. Further, audio may also be included as part of the animations, such as ambient sounds that may also incorporate differences between successive outputs.

In a further example, animations 510, 512 are used to cause objects already included in the digital image 106 to exhibit movement, as if being blow by the wind. To do so, the digital content transformation module 304 configures timing of output of animation 512 based on timing of output of animation 510 (e.g., and vice versa) to specify rendering of the first and second animations as part of the digital image 106. In the illustrated example, this is performed to synchronize movement of respective objects (e.g., trees) to appear as if blown by the same wind gust. Movement exhibited by animation 510 to appear as a wind gust, for instance, may be mimicked by movement exhibited by animation 512.

This may also be used to promote differences in movement exhibited by corresponding objects in the digital image 106 such that the movement is not synchronized. Continuing with the previous example, the animations 510, 512 may be configured to exhibit movement by also mimicking an effect of a light breeze on the trees. In real life, such movements are not synchronized. Accordingly, in this example the digital content transformation module 304 configures timing of the animations 510, 512 to exhibit differences, thereby also promoting realism in this example.

The digital content transformation module 304 may determine this timing, e.g., whether to synchronize or not synchronize the animations 136, based on metadata associated as part of the animations. This may include an amount of speed exhibited by the animations such that speeds over a certain threshold are synchronized and speeds below this threshold are not. This may also include defined relationships between animations, such as to coordinate animations of the snow fall 508 and the wind 510, 512 for consistency. A variety of other examples are also contemplated as further described in the following.

Figure 6:
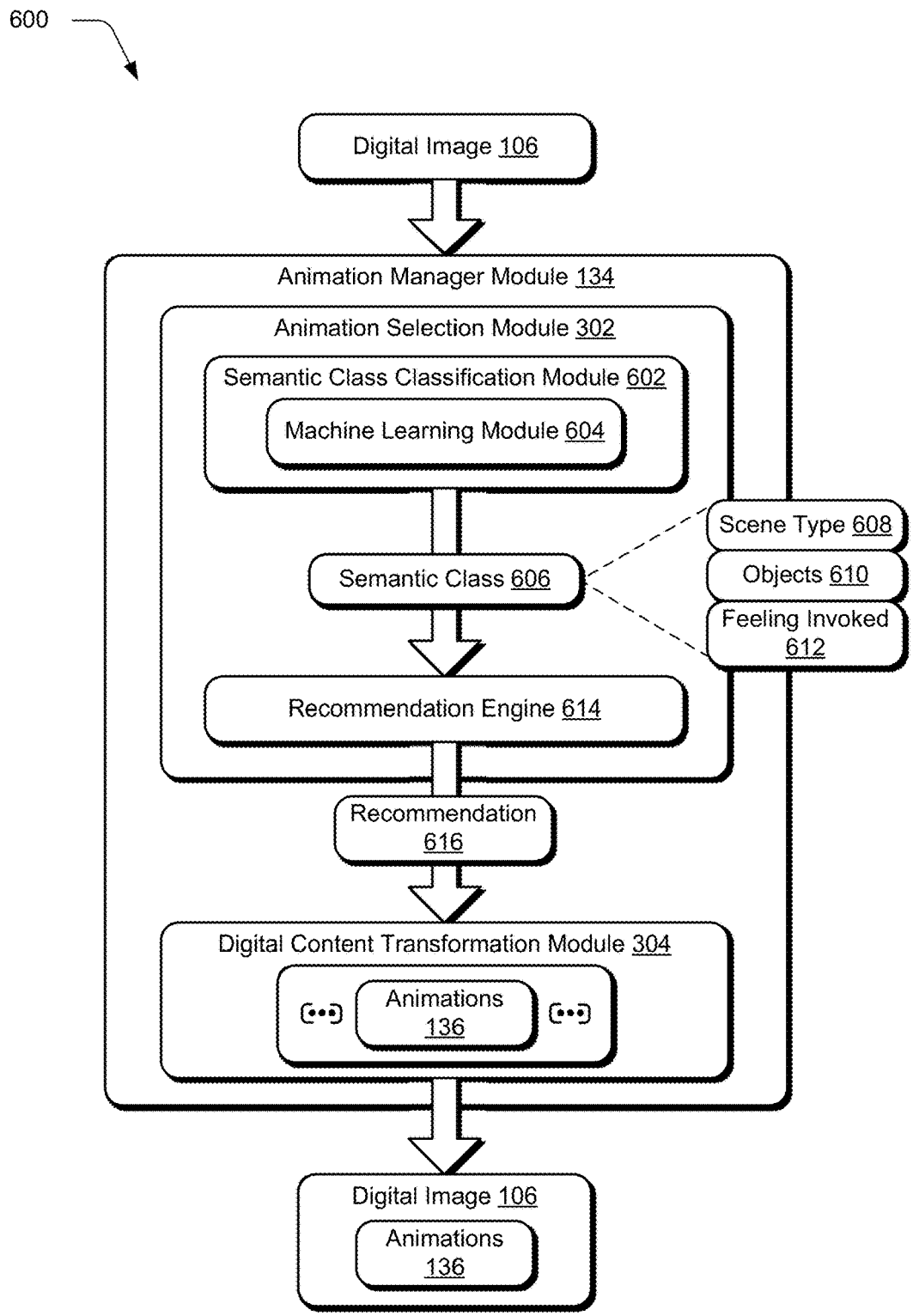
FIG. 6 depicts an example implementation of a system of FIG. 2 as configured to determine animations to be applied to the digital image automatically and without user intervention through machine learning.

FIG. 6 depicts an example implementation 600 of the system 200 of FIG. 2 as configured to determine animations to be applied to the digital image 106 automatically and without user intervention through machine learning. In the previous example of FIG. 2, user inputs serve as a basis to determine which animations are applied to the digital image 106, which may also include which objects are the subject of the animation. All or parts of this process may also be automated by the animation manager module 134 through machine learning.

As illustrated, the animation selection module 302 in this example includes a semantic class classification module 602. The semantic class classification module 602 is implemented at least partially in hardware to use a machine learning module 604 to determine a semantic class 606 that pertains to the digital image 106. The machine learning module 604, for instance, may be trained using a plurality of training images to recognize presence of a semantic class 606. The semantic class 606 defines "what" is included in the digital image 106, such as a scene type 608 (e.g., landscape, selfie, outdoors versus indoors, sporting event), objects 610 included in the digital image 106 (e.g., mountains, a car, person), and even feelings invoked 612 by the digital image 106, e.g., happy, serious, sad, inspirational, morose, and so forth.

A recommendation engine 614 is then employed to leverage the "what" defined by the semantic class 606 to form a recommendation 616 that identifies an animation 136 for application to the digital image 106. The recommendation 616, for instance, may be output in a user interface for user selection to determine which animations 136, if any, are to be applied to the digital image 106. In this way, the user may be guided based on the recommendations 616 and thus may be exposed to animations 136 that the user might not otherwise be aware. In another example, the recommendation 616 is provided automatically and without user intervention to the digital content transformation module 304.

Figure 7:
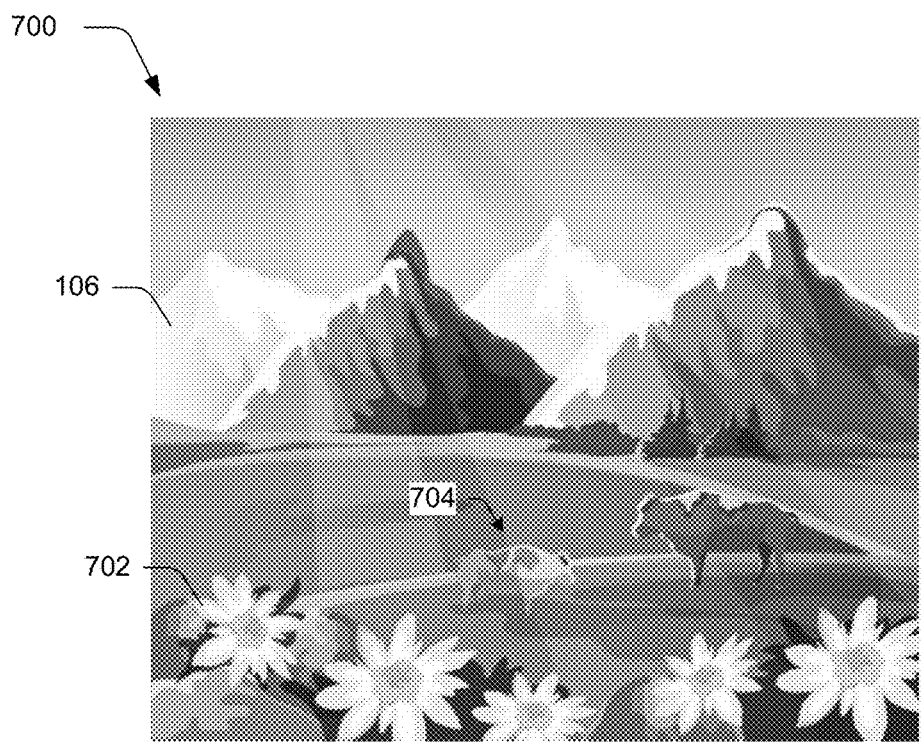
FIGS. 7 and 8 depict example implementations of determination of applicability of animations to objects in the digital image.
Figure 8:
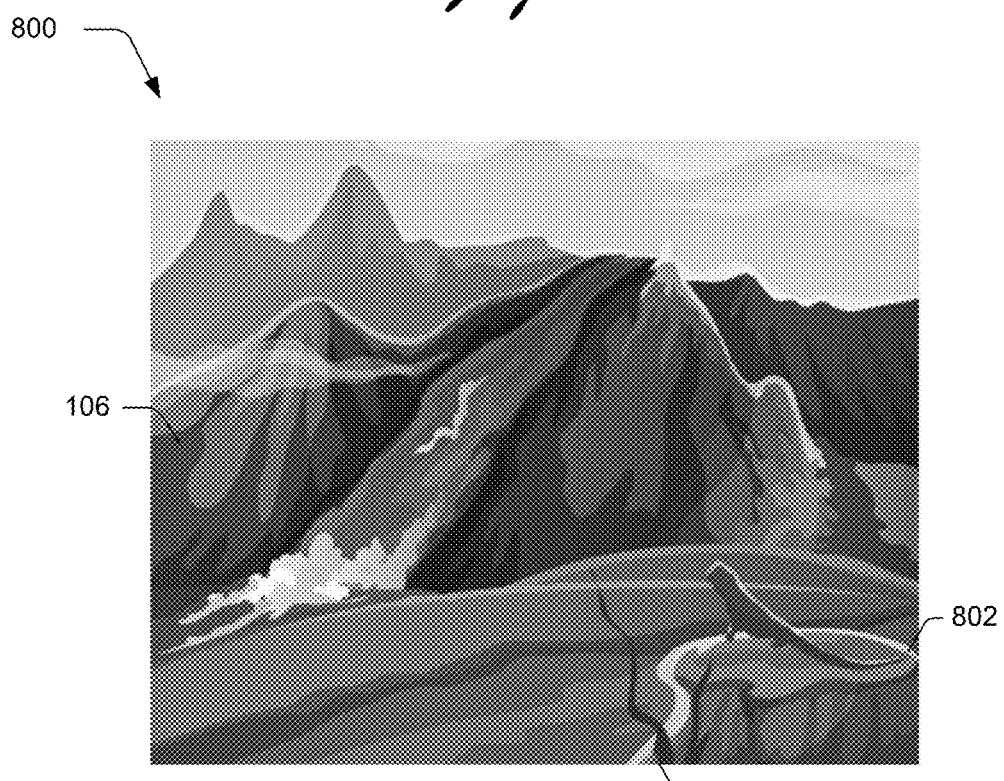

Based on the recommendation 616, the digital content transformation module 304 determines "how" to apply the recommended animations 136. This may include a determination of which objects that are included in the digital image 106 are capable of or likely to exhibit effects of the animations 136. As shown in example implementations 700, 800 of FIGS. 7 and 8, for instance, the digital content transformation module 304 may receive an indication that an animation of wind is to be applied to the digital image 106. The digital content transformation module 304 may then employ a decision tree based on objects identified in the image using machine learning to detect which objects are to exhibit the animation as well as how that animation is to be exhibited.

For the digital image 106 of FIG. 6, for instance, a first decision may include whether the object is capable of exhibiting wind-initiated movement. The next decision involves a type of movement wind-initiated movement that may be exhibited. For example, a determination may be made as to whether the object is a plant 602 and thus exhibits swaying movement as part of the animation. In another example, a determination is made that the object 604 is an animal. A determination is then made as to whether the animal object 604 has hair, and if so, a hair-related animation for wind-initiated movement is employed. When applied to the object 702 as a lizard in the digital content 106 of FIG. 7, on the other hand, the lizard does not include hair and thus this animation is not employed for that object. However, the digital content 106 of FIG. 7 does include a plant 704 that is capable of exhibiting swaying movement. In this way, the digital content transformation module 304 is configured to promote realism of the animations when applied to the digital image 106. A variety of other examples are also contemplated as previously described.

Example System and Device

FIG. 9 illustrates an example system generally at 900 that includes an example computing device 902 that is representative of one or more computing systems and/or devices that may implement the various techniques described herein. This is illustrated through inclusion of the animation manager module 134 by the computing device 902 of the user. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a system comprising:
an animation selection module implemented at least partially in at least one computing device including one or more processors and one or more computer readable storage media storing instructions that, when executed by the one or more processors, perform operations including:
obtaining, by the at least one computing device, a digital image;
classifying, by the at least one computing device, the digital image into at least one semantic class using a neural network as part of machine learning, the neural network trained to recognize the at least one semantic class;
generating, by the at least one computing device, a recommendation of a first animation and a second animation from a plurality of animations based on the at least one semantic class;
selecting, by the at least one computing device, the first animation and the second animation from the plurality of animations to be applied to the digital image based on classifying the digital image into the at least one semantic class; and
a digital content transformation module implemented at least partially in hardware of the computing device to perform operations including transforming an appearance of the digital image based on the selection, the transforming including coordinating:
a timing of output of the first animation and the second animation to each other within an iteration; and
a timing of the output of the first and second animations to each other to give a different appearance between multiple said iterations of the first and second animations.

2. The system as described in claim 1, wherein the classifying and the generating are performed automatically and without user intervention using a neural network.

3. The system as described in claim 1, wherein the digital content transformation module is further configured to transform the appearance of the digital image, automatically and without user intervention, based on the selection of the first animation and the second animation.

4. In a digital medium environment, a method implemented by at least one computing device, the method comprising:
obtaining, by the at least one computing device, a digital image;
classifying, by the at least one computing device, the digital image into at least one semantic class, the classifying performed using a neural network as part of machine learning, the neural network trained to recognize the at least one semantic class;
selecting, by the at least one computing device, first and second animations from a plurality of animations to be applied to the digital image based on classifying the digital image into the at least one semantic class; and
transforming, by the at least one computing device, an appearance of the digital image based on the selected first and second animations, the transforming including coordinating:
a timing of output of the first animation and the second animation to each other within an iteration; and
a timing of the output of the first and second animations to each other to give a different appearance between multiple said iterations of the first and second animations.

5. The method as described in claim 4, wherein the selection is further based on a user input received via a user interface output by the at least one computing device.

6. The method as described in claim 4, wherein the selecting based at least in part on machine learning includes:
classifying, by the at least one computing device, the digital image into the at least one semantic class using machine learning; and
generating, by the at least one computing device, a recommendation of the first and second animation from the plurality of animations based on the at least one semantic class.

7. The method as described in claim 6, wherein the machine learning is performed by the at least one computing device using a neural network trained for the at least one semantic class.

8. The method as described in claim 4, wherein the at least one semantic class includes identification of an object included in the digital image or a type of scene of the digital image.

9. The method as described in claim 4, wherein coordinating the timing of the first animation and the second animation within the iteration includes synchronizing actions performed by an object as part of the first animation with actions performed by another object as part of the second animation.

10. The method as described in claim 4, wherein coordinating the timing of output of the first animation and the second animation within the iteration includes configuring actions performed by an object as part of the first animation as not synchronized with actions performed by another object as part of the second animation.

11. The method as described in claim 4, wherein the transforming includes:
segmenting, by the at least one computing device, the digital image into a plurality of segments; and
replacing at least one of the plurality of segments having an object with at least one of the selected first and second animations.

12. In a digital medium environment, a system comprising:
means for generating a recommendation of first and second animations from a plurality of animations based on at least one semantic class identified from a digital image using machine learning;
means for selecting the first animation and the second animation from the plurality of animations to be applied to the digital image based on the identified at least one semantic class; and
means for transforming the digital image for output in an immersive augmented or virtual reality environment using the first animation and the second animation and output the transformed digital image as including the first animation and the second animation, the transforming including coordinating:
a timing of output of the first animation and the second animation to each other within an animation; and
a timing of the output of the first and second animations to each other to give a different appearance between multiple said iterations of the first animation and the second animation.

13. The system as described in claim 12, wherein the machine learning is performed using a neural network.

14. The system as described in claim 12, wherein the transforming means is configured to transform the digital image by:

segmenting the digital image into a plurality of segments; and replacing at least one of the plurality of segments with at least one of the first animation and the second animation.

* * * * *